(12) United States Patent
Yashiro et al.

(10) Patent No.: US 11,437,643 B2
(45) Date of Patent: Sep. 6, 2022

(54) ALL-SOLID-STATE SECONDARY BATTERY

(71) Applicant: Samsung Electronics Co., Ltd., Suwon-si (KR)

(72) Inventors: Nobuyoshi Yashiro, Kanagawa (JP); Seitaro Ito, Kanagawa (JP); Tomoyuki Shiratsuchi, Kanagawa (JP); Yuichi Aihara, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 374 days.

(21) Appl. No.: 16/280,610

(22) Filed: Feb. 20, 2019

(65) Prior Publication Data

US 2019/0260065 A1 Aug. 22, 2019

(30) Foreign Application Priority Data

Feb. 20, 2018 (JP) .............................. JP2018-27566
Feb. 20, 2019 (KR) ........................ 10-2019-0020049

(51) Int. Cl.
*H01M 10/04* (2006.01)
*H01M 4/133* (2010.01)
(Continued)

(52) U.S. Cl.
CPC ....... *H01M 10/0459* (2013.01); *H01M 4/133* (2013.01); *H01M 4/1397* (2013.01);
(Continued)

(58) Field of Classification Search
CPC ............. H01M 4/5815; H01M 4/1397; H01M 10/0562; H01M 10/0459
See application file for complete search history.

(56) References Cited

U.S. PATENT DOCUMENTS 6,303,017 B1 10/2001 Page et al.
7,601,318 B2 10/2009 Armand et al.
(Continued)

FOREIGN PATENT DOCUMENTS

JP 1996511581 A 12/1996
JP 2002237293 A 8/2002
(Continued)

OTHER PUBLICATIONS

Takashi Hakari et al., "All-solid-state lithium batteries with Li3PS4 glass as active material", Journal of Power Sources, Jun. 9, 2015, pp. 721-725, vol. 293.
(Continued)

*Primary Examiner* — Jonathan G Jelsma
(74) *Attorney, Agent, or Firm* — Cantor Colburn LLP

(57) ABSTRACT

An all-solid-state secondary battery including: a positive electrode active material layer including a positive electrode active material and a sacrificial positive electrode material having an oxidation-reduction potential which is less than a discharge voltage of the positive electrode active material; and a negative electrode active material layer including a negative electrode active material including an element alloyable with lithium or that forms a compound with lithium; and a solid electrolyte layer between the positive electrode active material layer and the negative electrode active material layer, wherein the sacrificial positive electrode material includes a sacrificial active material and a conductive agent.

32 Claims, 7 Drawing Sheets

(51) Int. Cl.
  *H01M 4/38*      (2006.01)
  *H01M 4/46*      (2006.01)
  *H01M 10/0562*   (2010.01)
  *H01M 4/1397*    (2010.01)
  *H01M 4/58*      (2010.01)

(52) U.S. Cl.
  CPC ............ *H01M 4/386* (2013.01); *H01M 4/46* (2013.01); *H01M 4/5815* (2013.01); *H01M 10/0562* (2013.01)

(56) References Cited

U.S. PATENT DOCUMENTS

| | | | |
|---|---|---|---|
| 8,507,135 | B2 | 8/2013 | Grupp et al. |
| 8,628,883 | B2 | 1/2014 | Ishida et al. |
| 8,922,171 | B2 | 12/2014 | Shimizu et al. |
| 9,806,373 | B2 | 10/2017 | Kambara et al. |
| 2008/0102353 | A1* | 5/2008 | Takezawa ......... H01M 10/0587 429/94 |
| 2011/0171502 | A1 | 7/2011 | Kottenstette et al. |
| 2013/0298386 | A1 | 11/2013 | Tarascon et al. |
| 2014/0027291 | A1 | 1/2014 | Vidal et al. |
| 2014/0072866 | A1* | 3/2014 | Kitada ................ B60L 55/00 429/200 |
| 2016/0149259 | A1 | 5/2016 | Osada et al. |
| 2016/0372784 | A1* | 12/2016 | Hayner ............... H01M 4/5825 |
| 2017/0162901 | A1 | 6/2017 | Chen et al. |
| 2017/0187066 | A1 | 6/2017 | Tsujimura et al. |
| 2017/0309914 | A1* | 10/2017 | Drews ................. H01M 4/0445 |
| 2018/0198118 | A1 | 7/2018 | Amiruddin et al. |
| 2018/0226633 | A1* | 8/2018 | Fujiki ............... H01M 10/0525 |
| 2019/0207209 | A1* | 7/2019 | Venkatachalam ..... H01M 4/505 |
| 2019/0214677 | A1* | 7/2019 | Yamada ................ H01M 4/587 |

FOREIGN PATENT DOCUMENTS

| | | |
|---|---|---|
| JP | 2004509058 A | 3/2004 |
| JP | 2010219047 A | 9/2010 |
| JP | 2011090876 A | 5/2011 |
| JP | 2011165343 A | 8/2011 |
| JP | 2013080616 A | 5/2013 |
| JP | 2013516746 A | 5/2013 |
| JP | 2013125697 A | 6/2013 |
| JP | 2013529830 A | 7/2013 |
| JP | 2013201110 A | 10/2013 |
| JP | 2014502006 A | 1/2014 |
| JP | 2014510385 A | 4/2014 |
| JP | 2014116154 A | 6/2014 |
| JP | 2016041219 A | 3/2016 |
| JP | 6003831 B2 | 10/2016 |
| JP | 2016213105 A | 12/2016 |
| JP | 2017084515 A | 5/2017 |
| JP | 2017112044 A | 6/2017 |
| JP | 2017117753 A | 6/2017 |
| JP | 2019033053 A | 2/2019 |
| WO | 2012098551 A1 | 7/2012 |

OTHER PUBLICATIONS

JP OA issued Aug. 24, 2021 of Japanese Patent Application No. 2018-027566.

\* cited by examiner

PRIOR ART

ALL-SOLID-STATE SECONDARY BATTERY

CROSS-REFERENCE TO RELATED APPLICATION

This application claims priority to and the benefit of Japanese Patent Application No. 2018-027566, filed on Feb. 20, 2018, in the Japan Patent Office, and Korean Patent Application No. 10-2019-0020049, filed on Feb. 20, 2019, in the Korean Patent Office, and all the benefits accruing therefrom under 35 U.S.C. § 119, the contents of which are incorporated herein by reference in its entirety.

BACKGROUND

1. Field

The present disclosure relates to an all-solid-state secondary battery and a method of manufacturing an all-solid-state secondary battery.

2. Description of the Related Art

An all-solid-state secondary battery including a solid electrolyte, and which does not include a liquid electrolyte, has increased safety compared to a lithium-ion secondary battery using a non-aqueous liquid electrolyte. The all-solid-state secondary battery may also be manufactured to have a lighter weight or a smaller size with a longer lifespan.

To increase the energy density of an all-solid-state secondary battery, lithium metal has been suggested as a negative electrode active material. For example, lithium metal has a specific capacity (capacity per unit mass) of 3861 mAh/g, which is about 10 times greater than the 372 mAh/g specific capacity of graphite. By using lithium metal as a negative electrode active material, the all-solid-state secondary battery may be manufactured in a planar configuration and have increased power output.

Despite the advances in the development of an all-solid-state secondary battery, there remains a need for an improved all-solid-state secondary battery including lithium metal as a negative electrode electroactive material.

SUMMARY

Provided is an all-solid-state secondary battery including lithium as a negative electrode electroactive material and having improved characteristics.

Additional aspects will be set forth in part in the description which follows and, in part, will be apparent from the description, or may be learned by practice of the presented embodiments.

According to an aspect of an embodiment, an all-solid-state secondary battery includes: a positive electrode active material layer including a positive electrode active material, and a sacrificial positive electrode material having an oxidation-reduction potential which is less than a discharge voltage of the positive electrode active material; and a negative electrode active material layer including a negative electrode active material comprising an element alloyable with lithium or that forms a compound with lithium; and a solid electrolyte layer between the positive electrode active material layer and the negative electrode active material layer, wherein the sacrificial positive electrode material comprises a sacrificial active material and a conductive agent.

In some embodiments, the sacrificial positive electrode material has an ionic conductivity of about $1\times10^{-7}$ Siemens per centimeter or greater.

In some embodiments, the sacrificial positive electrode material has an electrical resistivity of about $1\times10^{10}$ Ohm per centimeter or less.

In some embodiments, the sacrificial active material may include a sulfide solid electrolyte material.

In some embodiments, the sulfide solid electrolyte material may include $Li_2S$—$P_2S_5$.

In some embodiments, the sulfide solid electrolyte material may include a sulfide represented by Formula 1:

$$xLiX\text{-}(1\text{-}x)(yLi_2S\text{-}(1\text{-}y)P_2S_5)$$   Formula 1 wherein, in Formula 1, $0 \le x \le 0.5$, $0.6 \le y \le 0.9$, and X includes Cl, Br, I, or a combination thereof.

In some embodiments, in Formula 1, $0.1 \le x \le 0.5$, and $0.6 \le y \le 0.9$.

In some embodiments, in Formula 1, $x=0$, and $0.4 \le y \le 0.9$.

In some embodiments, an amount of the sacrificial positive electrode material in the positive electrode active material layer is about 1 mass percent (mass %) to about 30 mass % or less, based on a total mass of the positive electrode active material.

In some embodiments, the conductive agent of the sacrificial positive electrode material includes a carbonaceous material.

In some embodiments, a weight ratio of the sacrificial active material to the conductive agent in the sacrificial positive electrode material may be in a range of about 99:1 to about 50:50.

In some embodiments, the sacrificial active material may a sulfide solid electrolyte material, and the conductive agent may be a carbonaceous material.

In some embodiments, the positive electrode active material may include a lithium compound having a layered rock-salt structure comprising Li and Ni, Co, Mn, Al, or a combination thereof.

In some embodiments, the positive electrode active material may include a lithium transition metal oxide represented by $LiNi_xCo_yAl_zO_2$ (NCA) or $LiNi_xCo_yMn_zO_2$ (NCM), wherein $0 < x < 1$, $0 < y < 1$, $0 < z < 1$, and $x+y+z=1$, and wherein x, y, and z are independently selected for $LiNi_xCo_yAl_zO_2$ and $LiNi_xCo_yMn_zO_2$.

In some embodiments, the positive electrode active material may include a lithium transition metal oxide represented by $LiNi_xCo_yAl_zO_2$ (NCA) or $LiNi_xCo_yMn_zO_2$ (NCM), wherein $0.7 < x < 1$, $0 < y < 0.3$, $0 < y < 0.3$, and $x+y+z=1$, and wherein x, y, and z are independently selected for $LiNi_xCo_yAl_zO_2$ and $LiNi_xCo_yMn_zO_2$.

In some embodiments, the negative electrode active material layer may not include lithium prior to charging.

In some embodiments, a lithium content per unit area of the negative electrode active material layer may be about 0% or greater to about 5% or less by weight with respect to a total lithium content per unit area of in the positive electrode active material layer.

In some embodiments, a ratio of an initial charge capacity of the negative electrode active material layer to an initial charge capacity of the positive electrode active material layer may satisfy the relationship of Equation 1:

$$0.002 < b/a < 0.5 \qquad \text{Equation 1}$$

wherein a is the initial charge capacity of the positive electrode active material layer and b is the initial charge capacity of the negative electrode active material layer.

In some embodiments, the negative electrode active material may be beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof.

In some embodiments, the negative electrode active material layer may further include amorphous carbon.

In some embodiments, an all-solid-state secondary battery includes: a positive electrode active material layer including a positive electrode active material; a negative electrode active material layer including a negative electrode active material including an element alloyable with lithium or that forms a compound with lithium, a lithium alloy, a lithium compound, or a combination thereof; a lithium metal layer including a lithium metal precipitate; and a solid electrolyte layer between the positive electrode active material layer and the negative electrode active material layer.

In some embodiments, the positive electrode may further include a sacrificial positive electrode material having an oxidation-reduction potential which may be less than a discharge voltage of the positive electrode active material, and wherein the sacrificial positive electrode material may include a sacrificial active material and a conductive agent.

In some embodiments, the negative electrode active material may be beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof.

In particular embodiments, the negative electrode active material layer may further include amorphous carbon.

In some embodiments, the all-solid-state secondary battery may further include a negative electrode current collector, wherein the negative electrode active material layer is on the negative electrode current collector.

In some embodiments, the lithium metal precipitate, the lithium alloy, the lithium compound, or a combination thereof, each independently may have a density of 0.481 to 0.534 grams per cubic centimeter at 25° C.

In some embodiments, the lithium metal layer is between the negative electrode current collector and the negative electrode active material layer, the lithium metal layer may be between the negative electrode active material layer and the solid electrolyte layer, or a combination thereof.

In some embodiments, the negative electrode active material layer may include a combination of amorphous carbon and at least one negative electrode active material that is beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof, and the lithium metal layer may be between the negative electrode active material layer and the negative electrode current collector.

In some embodiments, a method of manufacturing the all-solid-state secondary battery, includes: providing the positive electrode active material layer; disposing the solid electrolyte layer on the positive electrode active material layer; and disposing the negative electrode active material layer including a negative electrode active material on the solid electrolyte layer to manufacture the all-solid-state secondary battery, wherein the negative electrode active material may include an element alloyable with lithium or that forms a compound with lithium.

In some embodiments, the method further may include charging the all-solid-state secondary battery to form a lithium metal layer comprising a lithium metal precipitate.

In some embodiments, the charging to form the lithium metal layer is a first charging cycle.

In some embodiments, the lithium metal layer is formed on the negative electrode active material layer.

In some embodiments, wherein the lithium metal layer is formed between the negative electrode active material layer and the solid electrolyte layer.

In some embodiments, the providing of the negative electrode active material layer includes disposing the negative electrode active material on a negative electrode current collector.

In some embodiments, the lithium metal layer is formed between the negative electrode current collector and the negative electrode active material layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
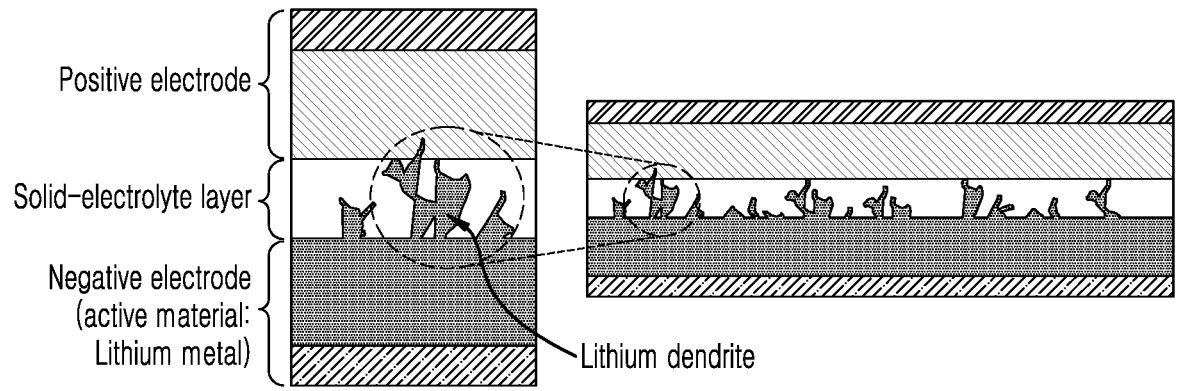
FIG. 1 is a cross-sectional view illustrating the formation of dendrites within a prior art negative electrode.

Reference will now be made in detail to embodiments, examples of which are illustrated in the accompanying drawings, wherein like reference numerals refer to like elements having substantially same function throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." As used herein, the term "and/or" includes any and all combinations of one or more of the associated listed items. "Or" means "and/or." Expressions such as "at least one of," when preceding a list of elements, modify the entire list of elements and do not modify the individual elements of the list. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "a combination thereof" is an open term that includes one or more of the listed items, and may include others.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Conventional methods of using lithium as a negative electrode active material may include the use of lithium or a lithium alloy to form a negative electrode active material layer on a negative electrode current collector, or alternatively, without forming the negative electrode active material layer on a negative electrode current collector. The latter method includes a solid electrolyte membrane disposed directly on the negative electrode current collector, where a lithium metal precipitate formed on a surface or surfaces of the negative electrode current collector and the solid electrolyte during charging, is used as a negative electrode active material. The negative electrode current collector may consist of a metal that is not alloyable with lithium and does not form a compound with lithium.

With reference to FIG. 1 (not a part of the claimed subject matter), the lithium metal precipitate on the negative electrode may grow in the form of branches through the gaps in the solid electrolyte with repeated charging and discharging. Due to its branch-like shape, the grown lithium metal precipitate is also called a dendrite. The dendrite may cause a short circuit in the secondary battery and may cause a reduction in the capacity of the secondary battery.

In this case where the negative electrode active material layer is not present (e.g., the negative electrode does not include the negative electrode active material layer), as the lithium is consumed by a side reaction, a reduction in capacity may occur. In general, in a lithium-ion secondary battery an initial coulombic efficiency after the first charge and discharge cycle may be smaller than a coulombic efficiency after the second charge and discharge cycle. This is due to the consumption of lithium ions during the initial charging reaction. Without being limited by theory, it is understood that the consumption of lithium ions may be attributed to: (1) a positive electrode active material that becomes substantially electrochemically inert as a result of electrochemical reactions, or (2) the consumption of lithium ions at a non-negative electrode site, for example, due to formation of a solid electrolyte interphase (SEI). In particular, when the negative electrode does not contain lithium, there is no further supply source of lithium. In this case, only the lithium remaining in the system after the initial charging reaction is available during the later charging and discharging cycles, and consequently the lithium-ion secondary battery may have a reduced charge and discharge capacity.

Of the above-described causes of the lithium ion consumption, it may be the difficult to resolve the problem associated with the irreversible capacity due to the first cause (i.e., a positive electrode active material that becomes substantially electrochemically inert as a result of electrochemical reactions), since the positive electrode active material is inert per se. On the other hand, the capacity reduction due to the above-described second cause (i.e., consumption of lithium ions at a non-negative electrode site due to formation of a solid electrolyte interphase) may be recovered by supplementing the consumed lithium.

U.S. Pat. No. 9,166,222 B2 suggests that a high-voltage lithium secondary battery to which supplemental lithium is added may be an option to attain a high specific capacity for a secondary battery using a non-aqueous liquid electrolyte.

Similarly, when a metal lithium layer is not present as a negative electrode active material layer in the negative electrode of an all-solid-state secondary battery, a lithium ion reserve is absent from the negative electrode, and the all-solid-state secondary battery may be subject to a capacity reduction due to the lithium consumption caused by side reactions. However, it is practically difficult to simply apply the technology of U.S. Pat. No. 9,166,222 B2, which is useful for a secondary battery with a non-aqueous liquid electrolyte, to an all-solid-state secondary battery to improve the specific capacity thereof. Thus, an all-solid-state secondary battery having satisfactory characteristics by inhibition of dendrite formation, which occurs with use of lithium metal as a negative active material as described, has not yet been developed.

Disclosed herein is an all-solid-state secondary battery having improved characteristics. The all-solid-state secondary battery includes a positive electrode including a positive electrode active material layer including a positive electrode active material, and a sacrificial positive electrode material having an oxidation-reduction potential which is less than a discharge voltage of the positive electrode active material; and a negative electrode including a negative electrode active material layer including a negative electrode active material that that includes an element that is alloyable with lithium or forms a compound with lithium; and a solid electrolyte layer between the positive electrode active material layer and the negative electrode active material layer, wherein the sacrificial positive electrode material includes a sacrificial active material and a conductive agent. The sacrificial positive electrode material therefore acts an initial source of additional lithium to be delivered to the negative electrode during initial charging.

In the all-solid-state secondary battery, lithium metal is precipitated on the negative electrode active material layer during charging.

Also disclosed herein is all-solid-state secondary battery including a positive electrode active material layer including a positive electrode active material; a negative electrode active material layer including a negative electrode active material including an element alloyable with lithium or forms a compound with lithium, a lithium alloy, a lithium compound, or a combination thereof; a metal layer including a lithium metal precipitate; and a solid electrolyte layer between the positive electrode active material layer and the negative electrode active material layer. In this case, the all-solid state secondary battery has already undergone initial charging.

As used herein, an alloy is a metal comprising a combination of elements. An element which is "alloyable" is an element that is able to form an alloy with another element. For example, an element that is alloyable with lithium forms an lithium alloy including that element.

Figure 2:
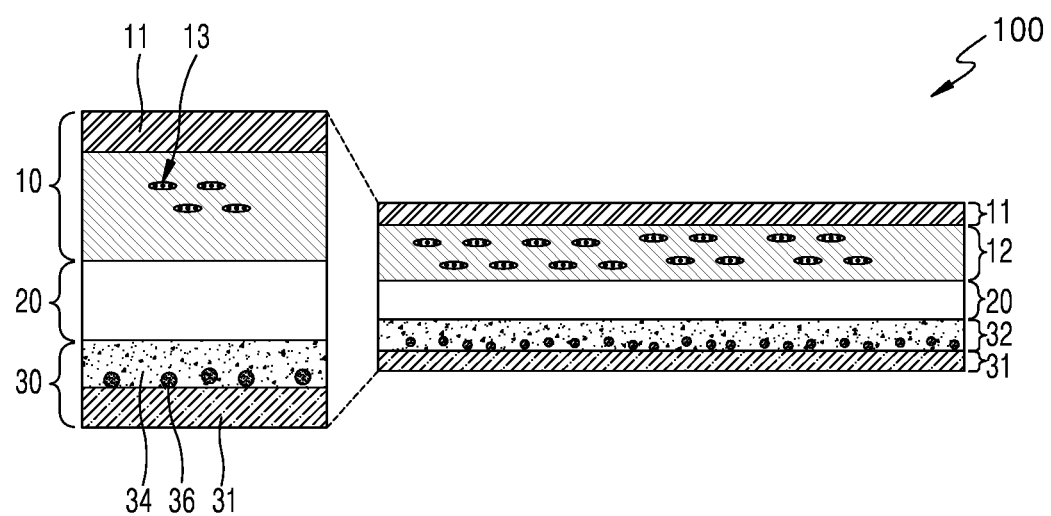
FIG. 2 is a schematic cross-sectional view illustrating a layered structure of an all-solid-state secondary battery, according to an embodiment.

A structure of an all-solid-state secondary battery 1 according to an embodiment will be described with reference to FIG. 2. FIG. 2 is a schematic cross-sectional view illustrating a structure of the all-solid-state secondary battery 1 according to an embodiment. Referring to FIG. 2, the all-solid-state secondary battery 100 may be a secondary battery including a solid electrolyte layer 20. The all-solid-state secondary battery 1 may be an all-solid-state lithium-ion secondary battery that allows migration of lithium ions between a positive electrode layer 10 and a negative electrode layer 30.

Accordingly, the all-solid-state secondary battery 1 includes the positive electrode layer 10, a solid electrolyte layer 20, and the negative electrode layer 30, as illustrated in FIG. 2.

Positive Electrode Layer

The positive electrode layer 10 may include a positive electrode current collector 11 and a positive electrode active material layer 12. The positive electrode current collector 11 may be a platelet type or a thin film type, comprising, consisting essentially of, or consisting of aluminum (Al), nickel (Ni), titanium (Ti), tungsten (W), iron (Fe), chromium (Cr), stainless steel, an alloy thereof, or a combination thereof. The positive electrode current collector 11 may be omitted in some embodiments.

The positive electrode active material layer 12 including sacrificial positive electrode material and a carbonaceous material 13 may be disposed between the positive electrode current collector 11 and the solid electrolyte layer 20 in such a way as to contact the positive electrode current collector 11 and the solid electrolyte layer 20. The positive electrode active material layer 12 may contain a positive electrode active material, and a sacrificial positive electrode material. The positive electrode active material layer 12 may further contain an electrically conductive agent to supplement electrical conductivity, and a solid electrolyte to supplement the ionic conductivity.

The positive electrode active material may be a positive electrode active material capable of reversibly intercalating and deintercalating lithium ions.

For example, the positive electrode active material may include a composite oxide of lithium and a metal. For example, the positive electrode active material may be a compound represented by the following formulae: $Li_aA^1_{1-b}B^1_bD^1_2$ (wherein $0.90 \leq a \leq 1.8$, and $0 \leq b \leq 0.5$); $Li_aE^1_{1-b}B^1_bO_{2-c}D^1_c$ (wherein $0.90 \leq a \leq 1.8$, $0 \leq b \leq 0.5$, and $0 \leq c \leq 0.05$); $LiE^1_{2-b}B^1_bO_{4-c}D^1_c$ (wherein $0 \leq b \leq 0.5$, and $0 \leq c \leq 0.05$); $Li_aNi_{1-b-c}Co_bB^1_cD^1_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB^1_cO_{2-\alpha}F^1_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB^1_cO_{2-\alpha}F^1_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1_cD^1_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB^1_cO_{2-\alpha}F^1_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB^1_cO_{2-\alpha}F^1_2$ (wherein $0.90 \leq a \leq 1.8$, $0 \leq b \leq 0.5$, $0 \leq c \leq 0.05$, and $0 < \alpha < 2$); $Li_aNi_bE^1_cG^1_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG^1_bO_2$ (wherein $0.90 \leq a \leq 1.8$, and $0.001 \leq b \leq 0.1$); $Li_aCoG^1_bO_2$ (wherein $0.90 \leq a \leq 1.8$, and $0.001 \leq b \leq 0.1$); $Li_aMnG^1_bO_2$ (wherein $0.90 \leq a \leq 1.8$, and $0.001 \leq b \leq 0.1$); $Li_aMn_2G^1_bO_4$ (wherein $0.90 \leq a \leq 1.8$, and $0.001 \leq b \leq 0.1$); $Q^1O_2$; $Q^1S_2$; $LiQ^1S_2$; $V_2O_5$; $LiV_2O_5$; $LiI^1O_2$; $LiNiVO_4$; $Li_{(3-f)}J^1_2(PO_4)_3$ (wherein $0 \leq f \leq 2$); $Li_{(3-f)}Fe_2(PO_4)_3$ (wherein $0 \leq f \leq 2$); and $LiFePO_4$. A combination comprising at least one of the foregoing may also be used.

In the above formulae, $A^1$ may be nickel (Ni), cobalt (Co), manganese (Mn), or a combination thereof; $B^1$ may be aluminum (Al), nickel (Ni), cobalt (Co), manganese (Mn), chromium (Cr), iron (Fe), magnesium (Mg), strontium (Sr), vanadium (V), a rare earth element, or a combination thereof; $D^1$ may be oxygen (O), fluorine (F), sulfur (S), phosphorus (P), or a combination thereof; $E^1$ may be cobalt (Co), manganese (Mn), or a combination thereof; $F^1$ may be fluorine (F), sulfur (S), phosphorus (P), or a combination thereof; $G^1$ may be aluminum (Al), chromium (Cr), manganese (Mn), iron (Fe), magnesium (Mg), lanthanum (La), cerium (Ce), strontium (Sr), vanadium (V), or a combination thereof; $Q^1$ may be titanium (Ti), molybdenum (Mo), manganese (Mn), or a combination thereof; may be chromium (Cr), vanadium (V), iron (Fe), scandium (Sc), yttrium (Y), or a combination thereof; and $J^1$ may be vanadium (V), chromium (Cr), manganese (Mn), cobalt (Co), nickel (Ni), copper (Cu), or a combination thereof.

For example, the positive electrode active material may be a lithium compound. Examples include lithium cobalt oxide (LCO), lithium nickel oxide, lithium nickel cobalt oxide, lithium nickel cobalt aluminum oxide (NCA), lithium nickel cobalt manganese oxide (NCM), lithium manganese oxide, lithium iron phosphate, or a combination thereof. The positive electrode active materials may be used alone or in combination.

For example, the positive electrode active material may include, a lithium compound having a layered rock-salt (e.g., rock-salt type) structure. The lithium compound having a layered rock-salt structure may include Li and Ni, Co, Mn, Al, or a combination thereof. Herein, the term "layered" as used herein refers to the configuration of the layered arrangement of the atoms in the structure of the lithium compound. The term "rock-salt structure" as used herein refers to a sodium chloride-type structure, in which the cations and anions form separate interpenetrating face-centered cubic lattices shifted by ½ of a unit cell dimension.

An example of the lithium compound is a transition metal oxide having the layered rocksalt structure, e.g., a ternary transition metal oxide, such as $LiNi_xCo_yAl_zO_2$ (NCA) or $LiNi_xCo_yMn_zO_2$ (NCM), where for each of NCA and NCM, $0<x<1$, $0<y<1$, $0<z<1$, and $x+y+z=1$.

For example, the lithium salt of a transition metal oxide having the layered rock-salt structure may be a lithium salt of a ternary transition metal oxide, such as $LiNi_xCo_yAl_zO_2$ (NCA) or $LiNi_xCo_yMn_zO_2$ (NCM), wherein $0.7<x<1$, $0<y<0.3$, $0<z<0.3$, and $x+y+z=1$.

A combination comprising at least one of the foregoing positive electrode active materials may also be used.

When the positive electrode active material includes a lithium salt of a transition metal oxide that has a layered rock-salt structure, as described above, the positive electrode active material may have a relatively high discharge voltage, and the all-solid secondary battery may have improved energy density and thermal stability.

For example, the positive electrode active material may have a charge-discharge voltage of about 0.1 volt (V) or greater (with respect to Li/Li$^+$), or about 0.25 V or greater, or about 1 V or greater, or about 0.25 V or greater, and in some embodiments, about 0.25 V or greater to about 4.5 V or less, or about 0.5 V or greater to about 4.5 V or less, or about 0.1 V or greater to about 4.5 V or less. The charge-discharge voltage may be measured after 2 cycles of charging-discharging of the positive electrode. In some embodiments, the positive electrode active material has a discharge voltage of about 2 V to less than about 5 V, preferably about 2V to about 4.5. Consequently, an all-solid-state secondary battery having improved discharge voltage and a high capacity may be obtained.

The positive electrode active material may include a coating layer. In one or more embodiments, the coating layer may cover a portion of the surface of the positive electrode active material or may cover the entire surface. The coating layer may be in the shape of a continuous layer or may be present as independent and/or interconnected islands on the surface of the positive electrode active material. In some embodiments, the coating layer may include a coating element compound selected from at least one of oxide, hydroxide, oxyhydroxide, oxycarbonate, and hydroxycarbonate of the coating element. In some embodiments, the coating layer may be amorphous or crystalline. In some embodiments, the coating element included in the coating layer may include lithium (Li), magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. For example, the coating layer may include, $Li_2ZrO_3$. The coating layer may be formed using any method that does not adversely affect the physical properties of the positive electrode active material when a compound of the coating element is used, for example, a spray coating method or a dipping method. The coating method may be determined by one of skill in the art without undue experimentation, and thus a detailed description thereof is omitted.

In an embodiment, the positive electrode active material may be composed of (e.g., comprise, consist essentially of, or consist of) a lithium salt of a ternary transition metal oxide, such as NCA or NCM. When nickel (Ni) is included in the positive electrode active material, the capacity and energy density of the all-solid-state secondary battery may be increased while the metal elution of the positive electrode active material in a charged state may be reduced. Accordingly, the all-solid-state secondary battery according to an embodiment may have excellent long-term reliability and cycle characteristics in a charged state.

The positive electrode active material may have, for example, a spherical particle shape, such as a circular particle shape, an oval particle shape, or a combination thereof. A particle diameter of the positive electrode active material may be in a range applicable to a positive electrode active material for an existing all-solid secondary battery. In addition, an amount of the positive electrode active material for the positive electrode layer 10 is not particularly limited, and may be in a range applicable to a positive electrode active material for an existing all-solid secondary battery.

The charge capacity of the positive electrode active material layer may be obtained by multiplying a charge specific capacity of the positive electrode active material by a mass of the positive electrode active material in the positive electrode active material layer, as shown in Equation 2.

$$Q(\text{mAh}) = q(\text{mAh/g}) \cdot m(\text{g}) \qquad \text{Equation 2}$$

wherein Q is the initial charge capacity, q is the specific capacity of the positive electrode active material, and m is the mass of the positive electrode active material.

When multiple positive electrode active materials are used, the initial charge capacity is determined based on the relative content of each cathode active material. For example, the initial charge capacity of the positive electrode active material layer may be determined by multiplying the charge specific capacity by the mass of each positive electrode active material, and a sum of these values is used as the initial charge capacity of the positive electrode active material.

In practice, the charge capacities of the positive electrode active material layer and the negative electrode active material layer may be directly measured with all-solid-state half battery. As used herein a specific capacity refers to a capacity per unit mass and may be calculated by dividing the initial charge capacity by the mass of each active material.

Sacrificial Positive Electrode Material

The sacrificial positive electrode material may supplement the lithium ions that are consumed during the initial charging and discharging of the all-solid-state secondary battery. For example, the sacrificial positive electrode material releases lithium ions at the initial charging.

In particular, the sacrificial positive electrode material may participate in an oxidation-reduction reaction during initial charging, at a potential lower than the discharge voltage of the positive electrode active material, and release lithium ions. The released lithium ions may be absorbed into the negative electrode, and at the same time, a portion of the lithium ions may be used in a side reaction such as the formation of a solid electrolyte interphase (SEI).

Then, lithium ions may be released from the positive electrode active material through an oxidation-reduction reaction at a further higher potential. The released lithium ions may be absorbed into the negative electrode and at the same time a portion of the lithium ions may be used in a side reaction such as the formation of the SEI. However, due to the lithium ions originating from the sacrificial positive electrode material, consumption of the lithium ions originating from the positive electrode active material may be inhibited. In other words, the lithium ions originating from the sacrificial positive electrode material may compensate for the consumption of the lithium ions originating from the positive electrode active material. After charging, the lithium ions originating from both the positive electrode active material and the sacrificial positive electrode material are present in the negative electrode.

As a result, an amount of the lithium ion absorbed in the negative electrode active material layer (negative electrode) after charging is increased as compared with the case in which the sacrificial positive electrode material is not included in the positive electrode active material layer. Accordingly, a reduction in the capacity of the all-solid-state secondary battery caused by the consumption of lithium ions may be prevented, and the all-solid-state secondary battery may thereby have improved capacity.

Once the sacrificial positive electrode material has released lithium ions, the sacrificial positive electrode material undergoes an oxidation-reduction reaction at a potential lower than the discharge voltage of the positive electrode active material. Thus, when the charging-discharging is performed after the second cycle, the oxidation-reduction reaction does not inhibit the charging-discharging reaction of the positive electrode active material.

In one or more embodiments, the sacrificial positive electrode material may have ionic conductivity and electrical conductivity. Due to having both ionic conductivity and electrical conductivity, the sacrificial positive electrode material may release lithium ions during initial charging. In this regard, if the sacrificial positive electrode material does not have ionic conductivity or electrical conductivity, the sacrificial positive electrode material may not release lithium ions during initial charging.

The sacrificial positive electrode material may have an ionic conductivity of about $1\times10^{-7}$ Siemens per centimeter (S/cm) or greater, or about $1\times10^{-5}$ S/cm or greater, or about $1\times10^{-4}$ S or greater, or about $1\times10^{-3}$ S/cm or greater, as measured at 25° C.

The sacrificial positive electrode material may have an electrical resistivity of about $1\times10^{10}$ Ohms·centimeter ($\Omega$·cm) or less, or about $1\times10^{8}$ $\Omega$·cm or less, or about $1\times10^{6}$ $\Omega$·cm or less, or about $1\times10^{4}$ $\Omega$·cm or less, as measured at 25° C.

The sacrificial positive electrode material having ionic conductivity and electrical conductivity may be any material that may be involved in an oxidation-reduction reaction at a potential lower than the discharge voltage of the positive electrode active material. For example, the sacrificial positive electrode material may include a combination of a sacrificial active material such as a sulfide solid electrolyte material, and a conductive agent such as a carbonaceous material. The sulfide solid electrolyte material may be, for example, a sulfide-based material. The sacrificial active material may include a lithium compound, and may be a lithium-rich material and at the same time may have lithium ion conductivity. The conductive agent may have electrical conductivity as well. Accordingly, the mixture of a sacrificial active material and a conductive agent may serve as the sacrificial positive electrode material.

For example, the sacrificial active material may be a sulfide-based solid electrolyte material that is a lithium-containing sulfide, such as $aLi_2S$-$(1-a)P_2S_5$ (wherein $0<a<1$); $aLi_2S$-$bP_2S_5$-$cLiX$ (wherein X is a halogen atom, e.g., F, Cl, Br, I, or a combination thereof, and wherein $0<a<1$, $0<b<1$, $0<c<1$, and $a+b+c=1$); $aLi_2S$-$bP_2S_5$-$cLi_2O$ (wherein $0<a<1$, $0<b<1$, $0<c<1$, and $a+b+c=1$); $aLi_2S$-$bP_2S_5$-$cLi_2O$-$dLiI$ (wherein $0<a<1$, $0<b<1$, $0<c<1$, $0<d<1$ and $a+b+c+d=1$); $aLi_2S$-$(1-a)SiS_2$ (wherein $0<a<1$); $aLi_2S$-$bSiS_2$-$cLiI$ (wherein $0<a<1$, $0<b<1$, $0<c<1$, and $a+b+c=1$); $aLi_2S$-$bSiS_2$-$cLiBr$ (wherein $0<a<1$, $0<b<1$, $0<c<1$, and $a+b+c=1$); $aLi_2S$-$bSiS_2$-$cLiCl$ (wherein $0<a<1$, $0<b<1$, $0<c<1$, and $a+b+c=1$); $aLi_2S$-$bSiS_2$-$cB_2S_3$-$dLiI$ (wherein $0<a<1$, $0<b<1$, $0<c<1$, $0<d<1$, and $a+b+c+d=1$); $aLi_2S$-$bSiS_2$-$cP_2S_5$-$dLiI$ (wherein $0<a<1$, $0<b<1$, $0<c<1$, $0<d<1$, and $a+b+c+d=1$); $aLi_2S$-$(1-a)B_2S_3$ (wherein $0<a<1$); $aLi_2S$-$bP_2S_5$-$cZ_mS_n$ (wherein m and n are each independently positive integers between 1 and 10, Z is Ge, Zn, or Ga, and wherein $0<a<1$, $0<b<1$, $0<c<1$, and $a+b+c=1$); $aLi_2S$-$(1-a)GeS_2$ (wherein $0<a<1$); $aLi_2S$-$bSiS_2$-$cLi_3PO_4$ (wherein $0<a<1$, $0<b<1$, $0<c<1$, and $a+b+c=1$); $aLi_2S$-$bSiS_2$-$cLi_pMO_q$ (wherein p and q are each independently positive integers between 1 and 10, wherein $0<a<1$, $0<b<1$, $0<c<1$, and $a+b+c=1$, and M may be P, Si, Ge, B, Al, Ga, or In); or a combination thereof. The above-listed compounds may be used alone or in combination comprising at least one of the foregoing sulfide-based solid electrolyte materials. The sulfide-based solid electrolyte materials may be prepared by treating a starting material (for example, $Li_2S$, $P_2S_5$, or the like) by a dissolution quenching method or mechanical milling. Optionally, after these treatments, an additional thermal treatment may be performed.

When the sulfide-based solid electrolyte material is involved in the oxidation-reduction reaction at a lower potential than the discharge voltage of a positive electrode active material, any of the above-listed sulfide-based solid electrolyte materials may be used as the sacrificial active material of the sacrificial positive electrode material by controlling a voltage level during the initial charging. The above-listed sulfide-based solid electrolyte materials also have excellent ionic conductivity.

For example, the sacrificial active material of the sacrificial positive electrode material may include $Li_2S$—$P_2S_5$. In this case, the sacrificial positive electrode material may have further improved ionic conductivity and at the same time a difference between the discharge voltage of the positive electrode active material and an oxidation-reduction potential of the sacrificial positive electrode material may be sufficiently increased.

For example, the sulfide-based solid electrolyte material may include a sulfide represented by Formula 1:

$$xLiX\text{-}(1\text{-}x)(yLi_2S\text{-}(1\text{-}y)P_2S_5) \qquad \text{Formula 1}$$

In Formula (1), $0\leq x\leq 0.5$, $0.6\leq y\leq 0.9$, and X may include Cl, Br, I, or a combination thereof.

The sulfide-based solid electrolyte material represented by Formula 1 may have excellent ionic conductivity and at the same time have an oxidation-reduction potential of about 2 V with respect to Li/Li$^+$, and thus may be suitable in combination with the above-described positive electrode active material (e.g., a lithium salt of a transition metal oxide having a layered rock-salt type structure).

For example, the sulfide-based solid electrolyte material represented by Formula 1 may be a compound in which:

$0.1 \leq x \leq 0.5$, and $0.6 \leq y \leq 0.9$, for example, $0.1 \leq x \leq 0.4$, and $0.7 \leq y \leq 0.8$;  (a)

or $x=0$ and $0.4 \leq y \leq 0.9$, for example, $x=0$ and $0.6 \leq y \leq 0.9$.  (b)

Non-limiting examples of the sulfide-based solid electrolyte material may include $0.75Li_2S\text{-}0.25P_2S_5$, $0.80Li_2S\text{-}0.20P_2S_5$, $0.35LiX\text{-}0.65(0.75Li_2S\text{-}0.25P_2S_5)$, $0.35LiX\text{-}0.65(0.80Li_2S\text{-}0.20P_2S_5)$, or a combination thereof.

The conductive agent included in the sacrificial positive electrode material may be, for example, a carbonaceous material. The carbonaceous material may have excellent electrical conductivity, may be miscible with the sulfide-based solid electrolyte material, and may impart appropriate electrical conductivity to the sacrificial positive electrode material.

The carbonaceous material may include activated carbon, graphite, carbon black, acetylene black, Ketjen black, carbon fibers, or a combination thereof. For example, the carbonaceous material may be activated carbon. The activated carbon may have a relatively large specific surface area, may sufficiently contact a surface of the sulfide-based solid electrolyte material, and may impart sufficient electrical conductivity to the sacrificial positive electrode material.

For example, the carbonaceous material may have a specific surface area of about 600 square meters per gram (m$^2$/g) or greater, about 800 m$^2$/g or greater, about 1,000 m$^2$/g or greater, or about 3,000 m$^2$/g or greater, and in some embodiments, about 800 m$^2$/g or greater to about 6,000 m$^2$/g or less, or about 950 m$^2$/g or greater to about 5,000 m$^2$/g or less, and in some other embodiments, about 1,000 m$^2$/g or greater to about 4,000 m$^2$/g or less. This may impart an increased electrical conductivity to the positive electrode layer. For example, such a high specific surface area of the carbonaceous material may be achieved by using activated carbon.

A weight ratio of the sacrificial active material to the conductive agent in the sacrificial positive electrode material may be that which provides an appropriate amount of lithium ions as well as sufficient ionic and electrical conductivity. For example, a weight ratio of the sacrificial active material, such as the sulfide-based solid electrolyte material to the conductive agent in the sacrificial positive electrode material may be about 99:1 to about 50:50, and in some embodiments, about 95:5 to about 70:30, or about 90:10 to about 85:25. When the weight ratio is within these ranges, a sufficient amount of lithium ions may be supplemented, and the ionic conductivity and the electronic conductivity of the sacrificial positive electrode material may be sufficiently improved.

The sacrificial positive electrode material may further include a binder. The binder included in the positive electrode active material layer may include, for example, polytetrafluoroethylene, polyvinylidene fluoride, polyethylene, or a combination thereof.

In the positive electrode active material layer 12, a conductive agent, a binder, and a sacrificial active material may be appropriately combined together as a sacrificial positive electrode material, which may be further combined with the above-described positive electrode active material.

The sacrificial active material and the conductive agent may be mixed by, for example, a ball milling method. By sufficiently contacting (mixing) the sacrificial active material and the conductive agent prior to preparation of the sacrificial positive electrode material, the obtained sacrificial positive electrode material may have sufficiently high ionic conductivity and electrical conductivity, and consequently, may release an increased amount of lithium ions during initial charging.

An oxidation-reduction potential of the sacrificial positive electrode material may be lower than a discharge voltage of the positive electrode active material. For example, the sacrificial positive electrode material has an oxidation-reduction potential which differs from the discharge voltage of the positive electrode active material by about 0.1 V or greater to about 5V or less, and in some embodiments, by about 0.25 V or greater to about 4.5 V or less, or about 0.5 V or greater to about 4.5 V or less. In some embodiments, the positive electrode active material has a discharge voltage of about 2 V to less than about 5 V, preferably about 2 V to about 4.5 V. This may enable the sacrificial positive electrode material to effectively release lithium ions during initial charging and to prevent the sacrificial positive electrode material from participating in charge-discharge reactions after the second cycle.

An amount of the sacrificial positive electrode material in the positive electrode active material layer is not specifically limited, and may, for example, correspond to the amount of lithium ions available for reaction during initial charging and discharging. For example, the amount of lithium ions available for reaction during initial charging and discharging may be determined by measuring the amount of lithium ions consumed during initial charging and discharging in an all-solid-state secondary battery having the same structure as the all-solid-state secondary battery according to one or more embodiments, except that the sacrificial positive electrode material is not included.

For example, an amount of the sacrificial positive electrode material in the positive electrode active material layer may be about 1 mass percent (mass %) or greater to about 30 mass % or less, and in some embodiments, about 5 mass % or greater to about 15 mass % or less, or about 7.5 mass % or greater to about 12 mass % or less, of the mass of the positive electrode active material. By including the above-described amounts of the sacrificial positive electrode material in the positive electrode active material layer, sufficient supplementation of the consumed lithium ions may be ensured. When the amount of the sacrificial positive electrode material included in the positive electrode active material layer is within these ranges, the amount of the sacrificial positive electrode material may be relatively reduced and as a result, the sacrificial positive electrode material is not used in the charging and discharging after the second cycle.

The solid electrolyte material that may be included in the positive electrode active material layer may be added separate from the sacrificial active material of the sacrificial positive electrode material, and may improve the overall ionic conductivity of the positive electrode active material layer. The solid electrolyte material in the positive electrode active material layer is not in close contact with the conductive agent and does not have electrical conductivity, and thus does not serve as the sacrificial positive electrode material. The solid electrolyte material in the positive electrode active material layer 12 may be the same material as or a different material from the sacrificial active material present in the sacrificial positive electrode material. The solid electrolyte material included in the positive electrode active material layer 12 may be the same material as or a different material from a solid electrolyte included in the solid electrolyte layer 20.

Solid Electrolyte Layer

The solid electrolyte layer 20 may be disposed between the positive electrode layer 10 and the negative electrode layer 30, and may include a solid electrolyte.

The solid electrolyte may include a sulfide-containing solid electrolyte material. This sulfide-based solid electrolyte material may include a lithium-containing sulfide as described above in connection with the sacrificial positive electrode material. The solid electrolyte may be amorphous or crystalline or may be a mixture of amorphous and crystalline forms.

The solid electrolyte may include a sulfide-containing solid electrolyte material including at least sulfur (S), phosphorous (P), and lithium (Li), among the above-listed sulfide-based solid electrolyte materials. For example, the solid electrolyte may include $Li_2S$—$P_2S_5$.

When the solid electrolyte uses a sulfide-containing solid electrolyte material including $Li_2S$—$P_2S_5$, a molar ratio of $Li_2S$ and $P_2S_5$ may be, for example, a range of about 50:50 to about 90:10, or about 60:40 to about 85:15, or about 75:25 to about 80:20.

In some embodiments, the sulfide-containing solid electrolyte may be an argyrodite-type solid electrolyte. For example, the argyrodite-type solid electrolyte may include $Li_6PS_5Cl$.

The solid electrolyte may have a spherical particle shape, such as, for example, a circular shape particle shape, an oval particle shape, or a combination thereof. In addition, a particle diameter of the solid electrolyte may be in a range applicable to the solid electrolyte for a conventional all-solid secondary battery.

The solid electrolyte layer may further include a binder. The binder may be, for example, styrene butadiene rubber (SBR), polytetrafluoroethylene (PTFE), polyvinylidene fluoride (PVdF), polyethylene (PE), or the like. The binder included in the solid electrolyte layer 20 may be the same material as or a different material from those used in the positive electrode active material layer 12 and the negative electrode active material layer 32.

Negative Electrode Layer

Referring to FIG. 2, the negative electrode layer 30 may include a negative electrode current collector 31 and the negative electrode active material layer 32 that is disposed between the negative electrode current collector 31 and the solid electrolyte layer 20. A material of the negative electrode current collector 31 may include, for example, copper (Cu), stainless steel, titanium (Ti), iron (Fe), nickel (Ni), an alloy thereof, or a combination thereof.

The negative electrode active material layer 32 may be placed between the negative electrode current collector 31 and the solid electrolyte layer 20 in such a way as to contact the negative electrode current collector 31 and the solid electrolyte layer 20. The negative electrode active material layer 32 may contain a negative electrode active material that forms an alloy or compound with lithium (an element that is alloyable with lithium). By the inclusion of such a negative electrode active material in the negative electrode active material layer 32, a lithium metal precipitate may be formed on the negative electrode active material layer during initial charging, which will be described later.

During initial charging, as the negative electrode active material of the negative electrode active material layer 32, which may form an alloy or compound with lithium as described above, forms an alloy or compound with lithium ions, the lithium ions may be absorbed into the negative electrode active material layer 32. Then, once a target capacity of the negative electrode active material layer 32 is exceeded, the lithium metal starts to be precipitated on one surface or on each of two opposite surfaces of the negative electrode active material layer 32, and may thus form a lithium metal layer including the lithium metal precipitate. As the lithium diffuses within negative electrode active material layer and is precipitated by the negative electrode active material that is able to form an alloy or compound with lithium, the lithium metal may be uniformly precipitated as a lithium metal layer along the surface of the negative electrode active material layer 32. That is, the lithium metal forms a lithium metal layer, such as a uniform lithium metal layer, on the negative electrode active material layer and is not present in the form of dendrites. During discharging, the lithium of the negative electrode active material layer 32 and the lithium metal layer may be ionized and migrate toward the positive electrode layer 10. Consequently, the lithium may be used as a negative electroactive material of the negative electrode, and as a result, the energy density of the all-solid-state secondary battery may be improved. In this case, dendritic formation may be suppressed to improve stability of the battery, and at the same time the lithium may also serve as a negative electroactive material of the negative electrode, and thus improve energy density.

Figure 4:
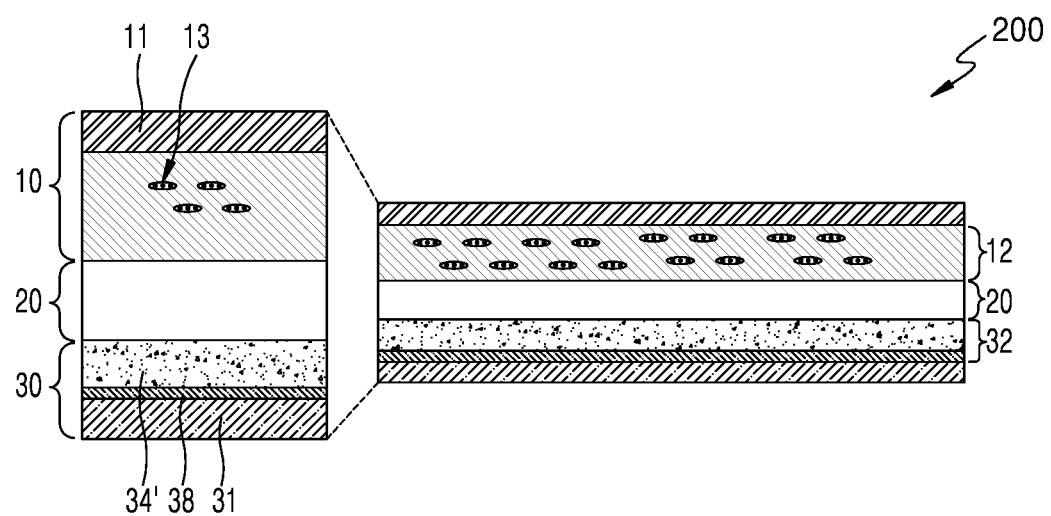
FIG. 4 is a cross-sectional view illustrating a layered structure of an all-solid-state secondary battery, according to an embodiment.
Figure 6:
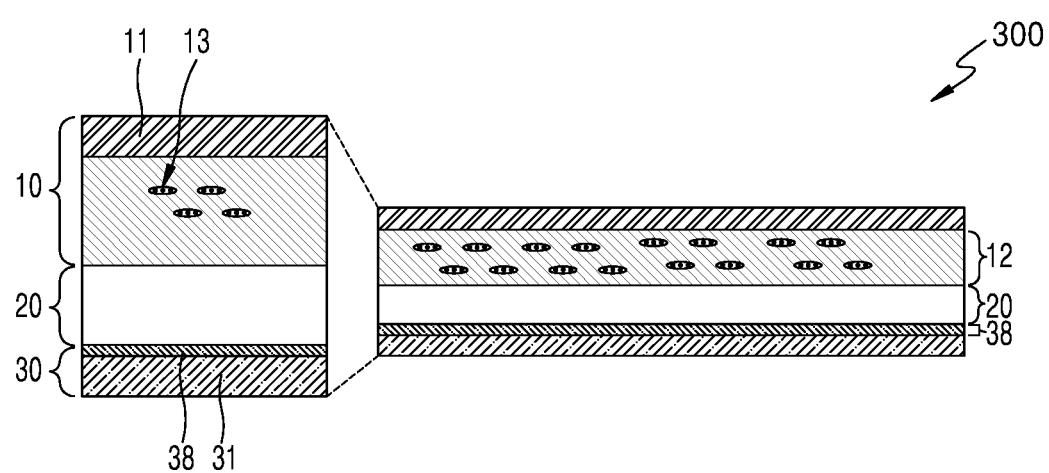
FIG. 6 is a cross-sectional view illustrating a layered structure of an all-solid-state secondary battery, according to an embodiment.

FIG. 2 is a schematic cross-sectional view illustrating an embodiment of an all-solid-state battery 100 prior to initial charging. The negative electrode active material layer 32 may include amorphous carbon 34 and an element that is able to form an alloy or compound with lithium 36 (i.e., one or more negative electrode active materials, as provided above). In FIG. 2, the element that is able to form an alloy or compound with lithium 36 is shown in the form of a particle disposed in the amorphous carbon 34. Alternatively, FIG. 4 is a schematic cross-sectional view illustrating another embodiment of an all-solid state-battery 200 prior to initial charging, where the negative electrode active material layer 32 may include the amorphous carbon 34' and a metal layer 38 including the element that is able to form an alloy or compound with lithium. In still another embodiment, FIG. 6 shows an all-solid-state battery 300 prior to initial charging, where the negative electrode active material layer 32 may include a metal layer 38' including the element that is able to form an alloy or compound with lithium.

When the lithium metal layer is formed between the negative electrode active material layer 32 and the negative electrode current collector 31, the resulting lithium metal layer may be covered by the negative electrode active material layer 32. In other words, the negative electrode active material layer 32 is disposed between the lithium metal layer and the solid electrolyte layer 20. In this case, the negative electrode active material layer 32 may function as a protective layer for the lithium metal layer. Accordingly, a short circuit and a capacity reduction in the all-solid-state secondary battery 1 may be inhibited, and at the same time the all-solid-state secondary battery 1 may have improved characteristics.

A capacity of the all-solid-state secondary battery according to one or more embodiments including the negative electrode active material layer may depend on a lithium content of the positive electrode active material present in the positive electrode active material layer. As described above, in one or more embodiments, the sacrificial positive electrode material may be included in the positive electrode active material layer to supplement the lithium ions consumed during initial charging. Accordingly, the design considerations for a target charge and discharge capacity of the all-solid-state secondary battery may be easily achieved, and the all-solid-state secondary battery may effectively exhibit the desired characteristics.

The negative electrode active material layer contains negative electrode active materials and optionally conductive amorphous carbon. Those materials may trap lithium ions, especially at the initial charging due to side reactions. The lithium ion becomes inactive in the materials, and the reversible redox capacity decreases. In addition, similar phenomena may occur at the positive electrode. Accordingly, the relative amount of lithium ions that are consumed by such side reactions and become inert may be reduced by the use of the sacrificial positive electrode material. Even with a relatively small amount of the sacrificial positive electrode material, a sufficient amount of lithium ions may be supplied to supplement the all-solid-state secondary battery to minimize or negate the effects of the side reactions.

As a method of ensuring the precipitation of the metal lithium on the negative electrode active material layer, for example, a charge capacity of the positive electrode active material layer may be greater than a charge capacity of the negative electrode active material layer. For example, a ratio (also referred to as "capacity ratio") of a charge capacity (in milliampere hours, mAh) of the negative electrode active material layer to a charge capacity (in mAh) of the positive electrode active material layer (i.e., the positive electrode layer) may satisfy the relationship of Equation 1:

$$0.002 < b/a < 0.5 \qquad \text{Equation 1}$$

wherein a is the charge capacity of the positive electrode active material layer and b is the charge capacity of the negative electrode active material layer.

When the capacity ratio represented by Equation 1 is 0.002 or less, characteristics of the all-solid-state secondary battery may be deteriorated, depending on the constitution of the negative electrode active material layer. Without being limited by theory, it is believed that this effect may occur because the negative electrode active material layer fails to sufficiently mediate the precipitation of lithium ions to appropriately form the lithium metal layer. In this case, disintegration of the negative electrode active material layer may occur with repeated charging and discharging, and dendrites may be more likely to grow. As a result, characteristics of the all-solid-state secondary battery may be deteriorated. Even when the lithium metal layer is formed between the negative electrode active material layer and the negative electrode current collector, the negative electrode active material layer may not effectively function as a protective layer. For example, the capacity ratio may be about 0.005 or greater, and in some embodiments, about 0.01 or greater, or about 0.02 or greater.

When the capacity ratio is 0.5 or greater, the majority of the lithium may be stored in the negative electrode active material layer during charging. Accordingly, formation of the lithium metal layer may be insufficient depending on the constitution of the negative electrode active material layer. For example, the capacity ratio may be about 0.1 or less, or about 0.08 or less, and in some embodiments, about 0.04 or less.

The negative electrode active material for realizing the above-described function may include, for example, an element alloyable with lithium or that forms a compound with lithium, such as beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof, a conversion reaction compound represented by a metal oxide such as $Si_xO_y$, $Sn_xO_y$, $Zn_xO_y$, $Cu_xO_y$, $W_xO_y$, $Fe_xO_y$ (wherein x and y are each independently 1 to 5), or a combination thereof. The negative electrode active material layer 32 may include one or a combination comprising at least one of the foregoing negative electrode active materials. For example, the negative electrode active material of the negative electrode active material layer 32 may include beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi) or a combination thereof, a conversion reaction compound represented by a metal oxide such as $Si_xO_y$, $Sn_xO_y$, $Zn_xO_y$, $Cu_xO_y$, $W_xO_y$, $Fe_xO_y$ (wherein x and y are each independently 1 to 5), or a combination thereof.

In particular embodiments, the negative electrode active material layer 32 may further include amorphous carbon. In some embodiments, the negative electrode active material layer 32 may comprise, consist essentially of, or consist of amorphous carbon as an electron conductor in addition to the negative electrode active material. For example, the negative electrode active material layer 32 may include a combination of amorphous carbon and at least one of beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi) or a combination thereof, a conversion reaction compound represented by a metal oxide such as $Si_xO_y$, $Sn_xO_y$, $Zn_xO_y$, $Cu_xO_y$, $W_xO_y$, $Fe_xO_y$ (wherein x and y are each independently 1 to 5), or a combination thereof. A weight ratio of the amorphous carbon to the negative electrode active material, for example such as gold, may be about 1:1 to about 1:3, or about 1:1 to about 1:2, or about 1:1 to about 1:1.5. When the negative electrode active material layer includes these materials, the all-solid-state secondary battery may have further improved characteristics.

In the negative electrode active material layer 32, the amorphous carbon may be a carbon black (such as acetylene black, furnace black, Ketjen black, or the like), graphene, or the like.

The negative electrode active material layer 32 may include amorphous carbon having a small specific surface area of about 100 m$^2$/g or less, or about 75 m$^2$/g or less, or about 50 m$^2$/g or less, and an amorphous carbon having a large specific surface area of about 300 m$^2$/g or greater, or about 400 m$^2$/g or greater, or about 500 m$^2$/g or greater, as measured by a nitrogen gas adsorption method.

When the negative electrode active material layer 32 includes, for example, amorphous carbon and at least one of beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof, a conversion reaction compound represented by a metal oxide such as $Si_xO_y$, $Sn_xO_y$, $Zn_xO_y$, $Cu_xO_y$, $W_xO_y$, $Fe_xO_y$ (wherein x and y are each independently 1 to 5), or a combination thereof, the negative electrode active material(s) may have a particle diameter of about 4 micrometers (μm) or less. In this case, the all-solid-state secondary battery may have further improved characteristics.

The particle diameter or particle size of the negative electrode active material may be an average particle diameter or average particle size obtained, for example, by measuring the particle diameters of the individual negative electrode active materials based on a transmission electron microscope (TEM) or a scanning electron microscope (SEM) image and calculating an arithmetic average of the measured particle diameters. As another example, the particle diameter or particle size of the negative electrode active material may be a "D50 particle size" or "median particle-size" corresponding to 50% of the particles in a distribution curve in which particles are accumulated in the order of particle diameter from the smallest particle to the largest particle and a total number of accumulated particles is 100%. The D50 particle size may be measured by methods known to those of skill in the art, for example, using a laser diffraction particle-size analyzer. The median particle-size may correspond closely to the arithmetic average particle diameter calculated from the electron microscope images. A lower limit of the particle diameter is not specifically limited, and may be, for example, 0.01 μm or greater, or about 0.05 μm or greater, or about 0.1 μm or greater.

A shape of the negative electrode active material is not particularly limited, and may be a particle shape. Alternatively, for example, the negative electrode active material may be in the form of a uniform layer, for example, a plating layer. In the former example, the lithium ions may migrate through gaps between the particles of the negative electrode active material and form a lithium metal layer between the negative electrode active material layer and the negative electrode current collector. In the latter example, the lithium metal layer may be formed between the negative electrode active material layer and the solid electrolyte layer. In some embodiments, the lithium metal layer may be formed between the negative electrode active material layer and the negative electrode current collector, and between the negative electrode active material layer and the solid electrolyte layer.

When the negative electrode active material includes a material that forms an alloy with lithium, for example, beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi) or a combination thereof, the negative electrode active material layer 32 may be a metal that forms an elemental layer of these materials. In other words, the non-ionic metals form the negative electrode active material layer. For example, the layer may be a plating layer. In some embodiments, the negative electrode active material layer 32 comprises, consists essentially of, or consists of an elemental layer beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof. When the negative electrode active material layer includes a carbonaceous material and a material that forms an alloy with lithium, for example gold or silver, a metal layer such as a plating layer may be formed between the negative electrode current collector and a layer of the carbonaceous material. In this case, the negative electrode active material layer may effectively have two layers: a first layer including the carbonaceous material and a second layer based on the plating layer.

The charge capacity of the negative electrode active material layer may be obtained by multiplying a charge specific capacity of the negative electrode active material by a mass of the negative electrode active material in the negative electrode active material layer, as shown in Equation 2.

$$Q(mAh) = q(mAh/g) \cdot m(g) \qquad \text{Equation 2}$$

wherein Q is the initial charge capacity, q is the specific capacity of the negative electrode active material, and m is the mass of the negative electrode active material.

When multiple negative electrode active materials are used, the initial charge capacity of the negative electrode active material layer is determined based on the relative content of each negative electrode active material, e.g., by multiplying the charge specific capacity of the negative electrode active material by the mass of each negative electrode active material. The charge specific capacity of the positive electrode material and the negative electrode active materials may be determined with an all-solid-state half battery using lithium metal as a counter electrode.

In practice, the charge capacities of the positive electrode active material layer and the negative electrode active material layer may be directly measured with all-solid-state half battery. As used herein a specific capacity refers to a capacity per unit mass and may be calculated by dividing the initial charge capacity by the mass of each active material.

The negative electrode active material layer 32 may include a binder. The binder may include, for example, styrene butadiene rubber (SBR), polytetrafluoroethylene, polyvinylidene fluoride, polyethylene, or a combination thereof. A combination comprising at least one of the foregoing binders may also be used. By the inclusion of the binder in the negative electrode active material layer 32, separation of the negative electrode active material may be prevented when the negative electrode active material is in a particle form. For example, when the negative electrode active material layer includes a binder, a content of the binder may be about 0.3 mass % to about 20 mass %, and in some embodiments, about 1 mass % to about 15 mass %, and in some other embodiments, about 3 mass % to about 15 mass %, with respect to a total mass of the negative electrode active material layer 22.

The negative electrode active material layer may further include one or more additives. For example, the additive may include a filler, a dispersing agent, an ion-conducting agent, or a combination thereof.

When the negative electrode active material is in a particle form, a thickness of the negative electrode active material layer may be, for example, about 1 μm to about 20 μm, or about 1 to about 15 μm, and in some embodiments, about 1 μm to about 10 μm. When the thickness of the negative active material layer is within these ranges, the above-described effect of the negative electrode active material layer may be attained, and characteristics of the all-solid-state secondary battery may be sufficiently improved to reduce a resistance of the negative electrode active material layer.

When the negative electrode active material is in the form of a uniform layer (plating layer), the thickness of the negative electrode active material layer may be, for example, about 1 nanometer (nm) to about 100 nm. In this case, the lower limit of the thickness may be about 1 nm and an upper limit of the thickness of the negative electrode active material layer may be about 95 nm, and in some embodiments, about 90 nm, and in some other embodiments, about 50 nm.

In one or more embodiments, to attain a significant lithium ion supplementary effect of the above-described sacrificial positive electrode material, the negative electrode active material layer prior to charging may include a material that does not contain lithium. For example, the negative electrode active material layer in the negative electrode layer may not include lithium. In some embodiments, a lithium content per unit area of the negative electrode active material layer prior to charging may be 0% or greater to about 5% or less, and in some embodiments, about 0% or greater to about 2% or less, or 0 mass % or greater to less than 1%, with respect to a lithium content per unit area of the positive electrode active material layer.

According to the one or more embodiments of the all-solid-state secondary battery as described above, lithium may be absorbed into the negative electrode active material layer during initial charging. Then, once a target lithium capacity of the negative electrode active material layer is exceeded, the lithium metal may start to be precipitated as a lithium metal layer on at least one surface of the negative electrode active material layer. At the negative electrode after initial charging, lithium is therefore included both in the negative electrode active material layer 32 and as a precipitated lithium metal layer on one or more surfaces of the negative active material layer. During discharging, the lithium in both the negative electrode active material layer and in the precipitated lithium metal layer may be ionized and migrate toward the positive electrode. Accordingly, the lithium may be used as a negative electrode active material. The negative electrode active material layer may inhibit deposition and growth of lithium metal dendrites. Accordingly, a short circuit and a capacity reduction in the all-solid-state secondary battery according to one or more embodiments may be inhibited, and the all-solid-state secondary battery according to one or more embodiments may have improved characteristics.

Figure 3:
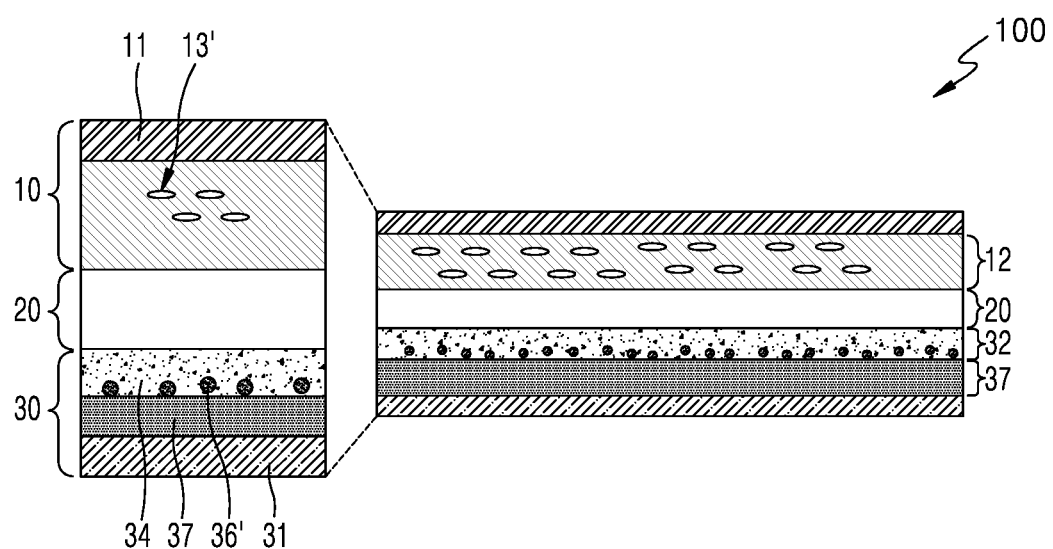
FIG. 3 is a schematic cross-sectional view illustrating a layered structure of an all-solid-state secondary battery after charging, according to an embodiment.

FIG. 3 is a schematic cross-sectional view illustrating an embodiment of an all-solid-state battery 100 after initial charging. In FIG. 3, after initial charging the negative electrode active material layer 32 may include, for example, amorphous carbon 34, the element that is able to form an alloy or compound with lithium 36, and a lithium or lithium alloy layer 37. The lithium metal layer is formed between the negative electrode active material layer 32 and the amorphous carbon layer 34'. As used herein, "a lithium or lithium alloy layer" refers to a layer that may include lithium metal, a lithium alloy, or a combination thereof.

Figure 5:
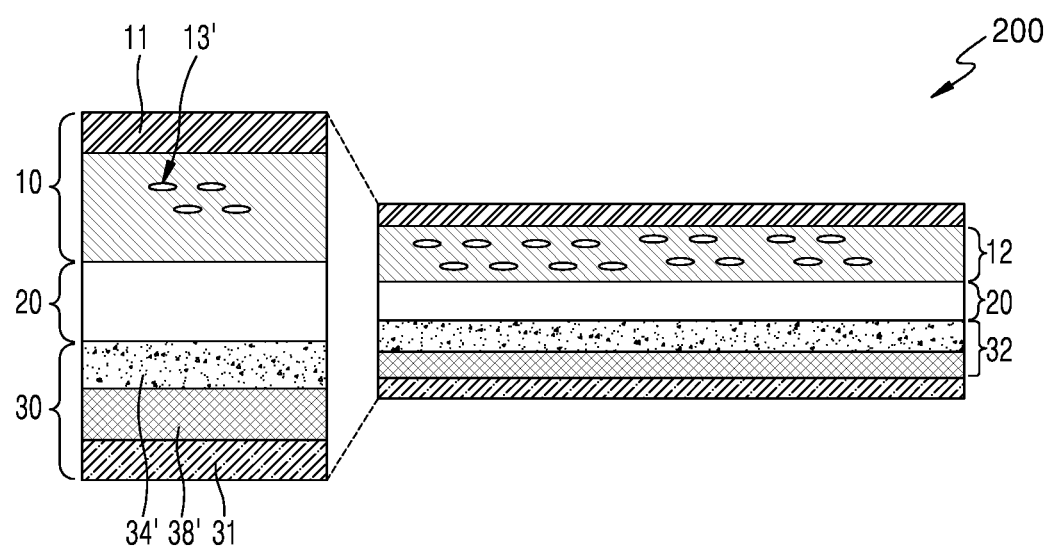
FIG. 5 is a cross-sectional view illustrating a layered structure of an all-solid-state secondary battery after charging, according to an embodiment.

FIG. 5 is a schematic cross-sectional view illustrating an embodiment of an all-solid-state battery 200 after initial charging. In FIG. 5, after initial charging the negative electrode active material layer 32 may include, for example, amorphous carbon layer 34' and a lithium alloy layer 38'. The lithium alloy layer (38') may comprise a homogenous lithium alloy, a heterogeneous lithium alloy, or a combination thereof. The lithium metal layer is formed between the negative electrode current collector 31 and the amorphous carbon layer 34'

Figure 7:
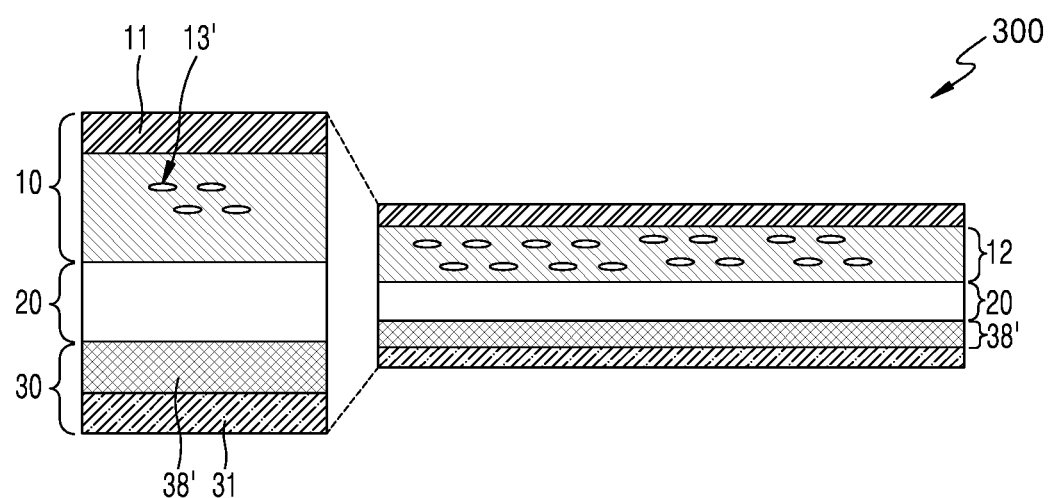
FIG. 7 is a cross-sectional view illustrating a layered structure of an all-solid-state secondary battery after charging, according to an embodiment.

FIG. 7 is a schematic cross-sectional view illustrating an embodiment of an all-solid-state battery 300 after initial charging. In FIG. 7, after initial charging a lithium alloy layer 38 (or, for example, a lithium or lithium alloy layer 38) is formed between the negative electrode current collector 31 and the solid electrolyte layer 20.

In some embodiments, after initial charging the negative electrode active material layer may include the lithium alloy, the lithium compound, or a combination thereof, and each independently may have a density of about 0.481 to about 0.534 grams per cubic centimeter ($g/cm^3$) at 25° C. In some embodiments, the lithium metal precipitate, the lithium alloy, the lithium compound, or a combination thereof, and each independently may have a density of about 0.481 to about 0.534 ($g/cm^3$) at 25° C.

Further, as lithium ions are released from the sacrificial positive electrode material of the positive electrode active material layer during initial charging, the released lithium ions may supplement the lithium ions consumed and lost by side reactions. Accordingly, the all-solid-state secondary battery may have an increased battery capacity and capacity retention.

Method of Charging

Next, a method of charging the all-solid-state secondary battery according to one or more embodiments will be described with reference to the above-described all-solid-stated secondary battery.

First, during initial charging, the all-solid-state secondary battery may be charged with a voltage around an oxidation-reduction potential of the sacrificial positive electrode material, for example, with a voltage of about 1.0 V to about 3.0 V (with respect to $Li/Li^+$). As a result, lithium ions may be released first from the sacrificial positive electrode material and out of the positive electrode layer. Subsequently, charging may be performed with a voltage around a charge-discharge voltage of the positive electrode active material, for example, with a voltage of about 4 V (with respect to Li/Li$^+$). As a result, the lithium ions originating from the sacrificial positive electrode material and the lithium ions originating from the positive electrode active material may be released out of the positive electrode layer. The released lithium ions may be partially consumed by side reactions, and the remaining lithium ions may be absorbed into the negative electrode layer.

Next, the subsequent charge-discharge cycles after the second cycle may be performed with a voltage set according to a charge-discharge voltage of the positive electrode active material. During the charge-discharge cycles, if the oxidation-reduction potential of the sacrificial positive electrode material is out of the charge-discharge voltage of the positive electrode active material, the sacrificial positive electrode material may not participate in charge and discharge reactions any longer.

Method of Manufacture

Next, a method of manufacturing the all-solid-state secondary battery 1 according to one or more embodiments will be described. The all-solid-state secondary battery according to one or more embodiments may be manufactured by separately providing (e.g., forming) the positive electrode layer 10, the negative electrode layer 30, and the solid electrolyte layer 20 and then stacking these layers upon one another.

The solid electrolyte layer may be formed of a solid electrolyte including a sulfide-based solid electrolyte material.

First, starting materials for forming the solid electrolyte layer may be treated using a melt quenching method or mechanical milling.

For example, when using the melt quenching method, the starting materials (for example, Li$_2$S, P$_2$S$_5$, or the like) may be mixed in predetermined amounts to form pellets. The obtained pellets may then be reacted under vacuum at a specific reaction temperature, and then subjected to quenching, thereby preparing the sulfide-based solid electrolyte material. For example, the reaction temperature for the mixture of Li$_2$S and P$_2$S$_5$ may be about 400° C. to about 1000° C., or about 500° C. to about 950° C., and in some embodiments, about 800° C. to about 900° C. For example, the reaction time may be about 0.1 hours to about 12 hours, or about 0.5 hour to about 12 hours, and in some embodiments, about 1 hour to about 12 hours. For example, the quenching (cooling) temperature of the reaction product may be about 10° C. or less, or about 5° C. or less, and in some embodiments, about 0° C. or less. For example, the cooling rate may be about 1° C. per second (° C./sec) to about 10,000° C./sec, or about 1° C./sec to about 5,000° C./sec, and in some embodiments, about 1° C./sec to about 1,000° C./sec.

When using mechanical milling, the starting materials (for example, Li$_2$S, P$_2$S$_5$, and the like) may be reacted with agitation, for example, by using a ball mill to prepare the sulfide-based solid electrolyte material. The agitation speed and the agitation time for the mechanical milling are not specifically limited. The higher the agitation speed, the higher the generation rate of the sulfide-based solid electrolyte material. The longer the agitation time, the higher the conversion rate of the starting materials into the sulfide-based solid electrolyte material.

Then, the mixed materials obtained using a melt quenching method or mechanical milling may be thermally treated at a predetermined temperature and then subjected to grinding, to thereby prepare a microsolid electrolyte material.

Subsequently, the solid electrolyte material prepared using the above-described method may be formed as a layer by using a known film formation method, for example, aerosol deposition, cold spraying, or sputtering, thereby forming the solid electrolyte layer. The solid electrolyte layer may be obtained by pressing a predetermined mass of the solid electrolyte material particles. In some embodiments, the solid electrolyte layer 20 may be prepared by mixing the solid electrolyte material, a solvent, and a binder together to obtain a mixture, coating with the mixture, drying the coated layer, and compressing the dried layer.

In an embodiment, the positive electrode layer may be formed according to the following method. First, a sacrificial positive electrode material and a positive electrode active material may be prepared. For example, the sacrificial positive electrode material may be prepared by mixing a sulfide-based solid electrolyte material with a conductive agent, for example, a carbonaceous material, and treating the resulting mixture by ball milling. The positive electrode active material may be prepared using a known method.

Subsequently, the positive electrode active material, the previously prepared solid electrolyte, the sacrificial positive electrode material, and various additives may be mixed together, and a solvent such as water or an organic solvent may then be added to the resulting mixture to obtain a slurry or a paste. The obtained slurry or paste may be coated on a current collector, dried, and then roll-pressed to thereby form the positive electrode layer 10. In some embodiments, the positive electrode layer 10 may be prepared by mixing the solid electrolyte, the positive electrode active material, the sacrificial positive electrode material, and various additives and then roll-pressing the resulting mixture.

The negative electrode layer may be formed in the same manner as used for the positive electrode layer. For example, source materials for the negative electrode active material layer, including a negative electrode active material, may be mixed together. Then, a solvent such as water or an organic solvent may be added to the resulting mixture to prepare a slurry or a paste. The obtained slurry or paste may be coated on the negative electrode current collector 31, dried, and then roll-pressed to thereby form the negative electrode layer 30.

In some embodiments, the negative electrode layer may be obtained by applying the negative electrode active material onto the negative electrode current collector by sputtering. In some other embodiments, the negative electrode layer may be obtained by placing a metal foil as the negative electrode active material layer on the negative electrode current collector.

The all-solid-state secondary battery 1 according to one or more embodiments may be manufactured by stacking the solid electrolyte layer 20, the positive electrode layer 10, and the negative electrode layer 30 prepared above upon one another. For example, the positive electrode layer 10 and the negative electrode layer 30 may be stacked one another to support the solid electrolyte layer 20 together between them, and the resulting stacked structure may then be pressed to thereby manufacture the all-solid-state secondary battery 1 according to one or more embodiments.

One or more embodiments of the present disclosure will now be described in detail with reference to the following examples. However, these examples are only for illustrative purposes and are not intended to limit the scope of the one or more embodiments of the present disclosure.

EXAMPLES

Manufacturing of all-Solid-State Secondary Battery

Example 1

Preparation of Positive Electrode Active Material

First, a positive electrode active material was prepared from a high-nickel-containing nickel cobalt manganese (NCM) material ("NCM 811", available from BASF). 1,000 grams (g) of the NCM and 320 g of a 0.5 mole percent (mol %) $Li_2ZrO_3$ (LZO) solution, prepared by dissolving $LiOCH_3$ and $Zr(OPr)_4$ in isopropyl alcohol (IPA), were combined to prepare NCM coated with $Li_2ZrO_3$. The coating of the NCM with the LZO precursor was performed using an electric fluidized bed coating device. The obtained coated active material was fired under atmospheric pressure at a temperature of about 350° C. for about 1 hour to thereby synthesize a LZO-coated positive electrode active material. A charge-discharge voltage of the positive electrode active material was about 4.25 V to about 2.5 V (with respect to $Li/Li^+$).

Preparation of Solid Electrolyte

LiCl, $Li_2S$, and $P_2S_5$ were mixed in a composition ratio of $Li_7PS_5Cl$ using a mortar, and then subject to a solid reaction under argon atmosphere using a planetary ball mill to thereby prepare a solid electrolyte precursor. The solid electrolyte precursor was thermally treated at about 500° C. to thereby obtain an argyrodite-type solid electrolyte.

Preparation of Sacrificial Positive Electrode Material $Li_2S$ and $P_2S_5$ were mixed in a molar ratio of $Li_2S$ to $P_2S_5$ of about 80:20 using a mortar and then subjected to a solid-state reaction under argon atmosphere using a planetary ball mill to thereby prepare a $80Li_2S-20P_2S_5$ solid electrolyte. Subsequently, the $80Li_2S-20P_2S_5$ solid electrolyte and a carbonaceous material (activated carbon) were mixed in a weight ratio of solid electrolyte to a carbonaceous material of about 90:10 using a ball mill to thereby obtain a sacrificial positive electrode material. An oxidation-reduction potential of the sacrificial positive electrode material was about 3.0 V to about 1.0 V (with respect to $Li/Li^+$).

Manufacturing of Test Cell

A Ni metal foil with a tin (Sn) plating layer was prepared as a negative electrode layer. The Sn plating layer served as a negative electrode active material and a negative electrode active material layer not containing lithium, while the Ni metal foil served as a current collector. A thickness of the Sn plating layer was about 50 nm.

The sacrificial positive electrode material, the positive electrode active material, and the argyrodite-type solid electrolyte were mixed together to obtain a positive electrode mixture. The Ni metal foil as the negative electrode current collector layer, the solid electrolyte layer including the argyrodite-type solid electrolyte, and the positive electrode mixture were stacked in the stated order in a Teflon can ($\varphi$=13 mm), and then pressed in an axial direction under a pressure of about 4 tesla per square centimeter ($t/cm^2$) to form pellets and manufacture a test cell of Example 1.

A charge capacity a of the positive electrode active material layer in the obtained test cell was about 1.8, and a charge capacity b of the negative electrode active material layer (Sn plating layer) was about 0.013. The capacity ratio (b/a) was about 0.007. The Sn plating layer as the negative electrode active material layer was used as a Li-metal precipitation medium, and not as a negative electrode active material storing lithium.

Example 2

A test cell of Example 2 was manufactured in the same manner as in Example 1, except that $LiNi_{0.8}Co_{0.15}Al_{0.05}O_2$ (nickel copper aluminum, NCA) was used as the positive electrode active material, instead of NCM.

An initial charge capacity a of the positive electrode active material layer in the obtained test cell was about 1.8, and an initial charge capacity b of the negative electrode active material layer (Sn plating layer) was about 0.013. The capacity ratio (b/a) was about 0.007. The Sn plating layer as the negative electrode active material layer was used as a Li-metal precipitation medium, and not as a negative electrode active material storing lithium.

Example 3

Preparation of Positive Electrode Layer $LiNi_{0.8}Co_{0.15}Mn_{0.05O2}$ (NCM) was prepared as a positive electrode active material. An argyrodite-type crystalline $Li_6PS_5Cl$ was prepared as a solid electrolyte material, and Teflon® (available from DuPont) was prepared as a binder. Carbon nanofibers (CNF) were prepared as an auxiliary conductive agent. The sacrificial positive electrode material prepared in Example 1 was used.

Subsequently, the positive electrode active material, the sacrificial positive electrode material, the solid electrolyte material, the conductive agent, and the binder were mixed in a weight ratio of about 85:4:15:3:1.5, and then stretched into a sheet form to thereby form a positive electrode sheet. This positive electrode sheet was adhered to an aluminum foil, having a thickness of about 18 μm and used as a positive electrode current collector, by pressing to thereby form a positive electrode layer. An initial charge capacity (charge capacity at the first cycle) of the positive electrode layer was about 17 mAh at a charging voltage of about 4.1 V. A total mass of the positive electrode was about 110 mg (about 190 mAh/g per unit mass of the active material).

Preparation of Negative Electrode Layer

A Ni foil having a thickness of about 10 μm was prepared as a negative electrode current collector. Silicon (Si) particles having a particle diameter of about 100 nm were prepared as a negative electrode active material.

Subsequently, 4 g of the negative electrode active material was put into a vessel, and 4 g of an n-methyl-2-pyrrolidone (NMP) solution containing 5 mass % of a binder (Kureha Co., #9300) was added thereto to obtain a mixture solution. The mixture solution was stirred with addition of the NMP solution a little at a time to prepare a slurry. The NMP was added until the slurry reached a viscosity suitable for coating with a blade coater. The slurry was coated on the Ni foil using the blade coater and then dried in the air at a temperature of about 80° C. for about 20 minutes to obtain a stacked structure. The stacked structure was vacuum-dried at about 100° C. for about 12 hours, thereby preparing a negative electrode layer. An initial charge capacity of the negative electrode layer was about 7 mAh. The capacity ratio (b/a), as determined by the Equation 1, was about 0.35.

1 mass % of a rubber-based binder with respect to the mass of the solid electrolyte was added to the $Li_6PS_5Cl$ solid electrolyte. Xylene and diethyl benzene were added to the resulting mixture and then stirred to prepare a slurry. The slurry was coated on a non-woven fabric with a blade coater and then dried in the air at about 40° C. to obtain a stacked structure. The stacked structure was vacuum-dried at about 40° C. for about 12 hours, thereby manufacturing a solid electrolyte layer.

Manufacturing of all-Solid-State Secondary Battery

The positive electrode layer, the solid electrolyte layer, and the negative electrode layer were stacked in the stated order, and then vacuum-sealed with a laminate film, to thereby manufacture an all-solid-state secondary battery (test cell). A positive electrode current collector and a negative electrode current collector were partially drawn out of the laminate film such as not to brake the vacuum condition of the battery. The drawn protruding portions were used as terminals of the positive electrode layer and the negative electrode layer. The all-solid-state secondary battery was treated under a hydrostatic pressure of about 490 megapascals (MPa) for about 30 minutes.

Comparative Example 1

A test cell of Comparative Example 1 was manufactured in the same manner as in Example 1, except that the sacrificial positive electrode material was not used in the positive electrode active material layer (positive electrode mixture).

Comparative Example 2

A test cell of Comparative Example 2 was manufactured in the same manner as in Example 2, except that the sacrificial positive electrode material was not used in the positive electrode active material layer (positive electrode mixture).

Comparative Example 3

A test cell of Comparative Example 3 was manufactured in the same manner as in Example 3, except that the sacrificial positive electrode material was not used in the positive electrode active material layer (positive electrode mixture).

Comparative Example 4

A test cell of Comparative Example 4 was manufactured in the same manner as in Example 1, except that the sacrificial positive electrode material was not used in the positive electrode active material layer (positive electrode mixture).

Evaluation

Initial discharge capacities of the test cells of Example 1 and Comparative Examples 1 and 4 were evaluated. The cut-off potential was about 4.2 V to about 3.0 V (with respect to Li/Li$^+$), and a current of 0.5 C was applied. The resulting initial discharge capacities are shown in Table 1.

TABLE 1

| Example | Initial discharge capacity (mAh/g) |
|---|---|
| Example 1 | 186 |
| Comparative Example 1 | 177 |
| Comparative Example 4 | 184 |

The test cell of Example 1 including the sacrificial positive electrode material was found to have a higher initial discharge capacity compared to the test cell of Comparative Example 1 not containing the sacrificial positive electrode material. Without being limited by theory, it is believed that lithium ions released from the positive electrode active material in the test cell of Comparative Example 1 during initial charging may partially be consumed in unintended reactions and not be able to reach the negative electrode or may be isolated, and not involved in electrochemical reactions on the negative electrode, so that such lithium ions may not return into the positive electrode active material during the initial charging, thereby reducing a capacity. Meanwhile, without being limited by theory, the higher initial discharge capacity of the test cell of Example 1 is attributed to supplementation of the lithium ions lost due to the above-described reasons by the sacrificial positive active material in the positive electrode during the initial charging, so that a discharge capacity reduction did not occur. Accordingly, the test cell of Example 1 was found to have an improved discharge capacity which is greater than the discharge capacity of the test cell of Comparative Example 1, due to the presence of rich Li in the negative electrode layer. Meanwhile, the test cell of Comparative Example 4 was found to have practical problems due to the use of the Li foil as the negative electrode layer, since it may be more likely to be subject to the formation of dendrites resulting in a short circuit, and may not retain long-lifespan battery characteristics Next, initial discharge capacity and cyclic capacity retention (cycle retention) of the test cells of Example 2 and Comparative Example 2 were evaluated. The cut-off potential was about 4.25 V to about 2.0 V (with respect to Li/Li+), and a current of 0.5 C was applied. The cycle retention was evaluated as a ratio of discharge capacity at the 120$^{th}$ cycle to the initial discharge capacity. The resulting initial discharge capacity and cycle capacity retention are shown in Table 2.

TABLE 2

| Example | Initial discharge capacity (mAh/g) | Cycle retention (%) |
|---|---|---|
| Example 2 | 212 | 93 |
| Comparative Example 2 | 202 | 86 |

Referring to Table 2, the test cell of Example 2 containing the sacrificial positive electrode material was found to have a higher initial discharge capacity, compared to the test cell of Comparative Example 2 not containing the sacrificial positive electrode material. Without being limited by theory, it is understood that the test cell of Example 2 was sufficiently supplemented with lithium ions from the sacrificial positive electrode material even when the lithium ions were lost during the initial charging and maintained a high discharge capacity.

Referring to Table 2, the test cell of Example 2 containing the sacrificial positive electrode material was also found to have a higher cycle retention compared to the test cell of Comparative Example 2 not containing the sacrificial positive electrode material. Without being limited by theory, it is understood that the lithium consumed due to deterioration in the test cell of Comparative Example 2 was not supplemented due to the lack of the sacrificial positive electrode material, whereas the lithium consumed in the test cell of Example 2 was supplemented from the sacrificial positive electrode material and consequently maintained a high cycle retention.

A difference in initial discharge capacity between the test cells of Example 1 and Example 2 is attributed to the use of the different positive electrode active materials and a difference in cut-off potential.

Next, after charging the test cells of Example 3 and Comparative Example 3, discharge curves at 0.33 C and 1 C were compared. The results are shown in Table 3. The cut-off potential for charging and discharging was about 4.2 V to about 2.0 V (with respect to Li/Li+). The initial discharge capacities, average discharge voltages, and energy densities were calculated using the discharge curves at 0.33 C.

TABLE 3

| Example | Initial discharge capacity (mAh/g) | Average discharge voltage (V) | Energy density (Wh/kg*) | Rate retention (%) |
|---|---|---|---|---|
| Example 3 | 212 | 3.75 | 795 | 92 |
| Comparative Example 3 | 202 | 3.75 | 755 | 87 |

*Wh/kg is Watt hours per kilogram

Referring to Table 3, the test cell of Example 3 containing the sacrificial positive electrode material in the positive electrode active material layer was found to have a discharge capacity of about 212 mAh/g at 0.33 C, higher than a discharge capacity of about 202 mAh/g in the test cell of Comparative Example 3 not containing sacrificial positive electrode material. The test cell of Example 3 was also found to have a higher energy density of about 795 Wh/kg, compared to the test cell of Comparative Example 3 having an energy density of about 755 Wh/kg. In addition, a rate retention calculated as a percentage of the capacity retention at a constant current of 1 C relative to the capacity retention at a constant current of 0.33, was also higher in the test cell of Example 3 at about 92%, compared to the test cell of Comparative Example 3 having a rate retention of about 87%.

As described above, the all-solid-state secondary battery according to one or more embodiments may have improved characteristics by using a negative electrode active material layer containing a negative electrode active material that may form an alloy or compound with lithium and using a sacrificial positive electrode material.

As described above, according to the one or more embodiments, characteristics of an all-solid-state secondary battery may be improved by using a negative electrode active material able to form an alloy or compound with lithium.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An all-solid-state secondary battery comprising:
a positive electrode active material layer comprising:
a positive electrode active material, and
a sacrificial positive electrode material having an oxidation-reduction potential which is less than a discharge voltage of the positive electrode active material;
a negative electrode active material layer comprising a negative electrode active material comprising an element alloyable with lithium or that forms a compound with lithium;
a solid electrolyte layer between the positive electrode active material layer and the negative electrode active material layer; and
a lithium metal layer comprising a lithium metal precipitate,
wherein the lithium metal layer is on the negative electrode active material layer,
wherein the sacrificial positive electrode material comprises a sacrificial active material and a conductive agent, and
wherein the sacrificial active material comprises a sulfide solid electrolyte material represented by Formula 1:

$x\mathrm{LiX}\text{-}(1-x)(y\mathrm{Li}_2\mathrm{S}\text{-}(1-y)\mathrm{P}_2\mathrm{S}_5)$  Formula 1 wherein, in Formula 1,
$0 \leq x \leq 0.5$,
$0.6 \leq y \leq 0.9$, and
X is Cl, Br, I, or a combination thereof.

2. The all-solid-state secondary battery of claim 1, wherein the sacrificial positive electrode material has an ionic conductivity of about $1 \times 10^{-7}$ Siemens per centimeter or greater.

3. The all-solid-state secondary battery of claim 1, wherein the sacrificial positive electrode material has an electrical resistivity of about $1 \times 10^{10}$ Ohms·centimeter or less.

4. The all-solid-state secondary battery of claim 1, wherein the sulfide solid electrolyte material comprises $\mathrm{Li}_2\mathrm{S}\text{—}\mathrm{P}_2\mathrm{S}_5$.

5. The all-solid-state secondary battery of claim 1, wherein $0.1 \leq x \leq 0.5$, and $0.6 \leq y \leq 0.9$.

6. The all-solid-state secondary battery of claim 1, wherein $x=0$, and $0.4 \leq y \leq 0.9$.

7. The all-solid-state secondary battery of claim 1, wherein an amount of the sacrificial positive electrode material in the positive electrode active material layer is about 1 mass percent or greater to about 30 mass percent or less, based on a total mass of the positive electrode active material.

8. The all-solid-state secondary battery of claim 1, wherein the conductive agent of the sacrificial positive electrode material comprises a carbonaceous material.

9. The all-solid-state secondary battery of claim 1, wherein a weight ratio of the sacrificial active material to the conductive agent in the sacrificial positive electrode material is in a range of about 99:1 to about 50:50.

10. The all-solid-state secondary battery of claim 1, wherein
the sacrificial active material is the sulfide solid electrolyte material, and
the conductive agent is a carbonaceous material.

11. The all-solid-state secondary battery of claim 1, wherein the positive electrode active material comprises a lithium salt having a layered rock-salt structure, the lithium salt comprising Li and an element comprising Ni, Co, Mn, Al, or a combination thereof.

12. The all-solid-state secondary battery of claim 1, wherein the positive electrode active material comprises a lithium transition metal oxide represented by $\mathrm{LiNi}_x\mathrm{Co}_y\mathrm{Al}_z\mathrm{O}_2$ or $\mathrm{LiNi}_x\mathrm{Co}_y\mathrm{Mn}_z\mathrm{O}_2$ wherein 0<x<1, 0<y<1, 0<z<1, and x+y+z=1, and
wherein x, y, and z are each independently selected for $LiNi_xCo_yAl_zO_2$ and $LiNi_xCo_yMn_zO_2$.

13. The all-solid-state secondary battery of claim 12, wherein the positive electrode active material comprises a lithium transition metal oxide represented by

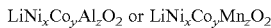

$LiNi_xCo_yAl_zO_2$ or $LiNi_xCo_yMn_zO_2$ wherein 0.7<x<1, 0<y<0.3, 0<y<0.3, and x+y+z=1, and
wherein x, y, and z are each independently selected for $LiNi_xCo_yAl_zO_2$ and $LiNi_xCo_yMn_zO_2$.

14. The all-solid-state secondary battery of claim 1, wherein prior to charging, the negative electrode active material layer does not comprise lithium.

15. The all-solid-state secondary battery of claim 1, wherein a lithium amount per unit area of the negative electrode active material layer is 0 weight percent or greater to about 5 weight percent or less, based on a total lithium content per unit area of the positive electrode active material layer.

16. The all-solid-state secondary battery of claim 1, wherein a ratio of an initial charge capacity of the negative electrode active material layer to an initial charge capacity of the positive electrode active material layer satisfies Equation 1:

$$0.002<b/a<0.5 \qquad \text{Equation 1}$$

wherein a is the charge capacity of the positive electrode active material layer and b is the charge capacity of the negative electrode active material layer.

17. The all-solid-state secondary battery of claim 1, wherein the negative electrode active material is beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof.

18. The all-solid-state secondary battery of claim 17, wherein the negative electrode active material layer further comprises amorphous carbon.

19. An all-solid-state secondary battery comprising:
a positive electrode active material layer comprising a positive electrode active material and a sacrificial positive electrode material comprising a sacrificial active material;
a negative electrode active material layer comprising a negative electrode active material comprising an element alloyable with lithium or that forms a compound with lithium, a lithium alloy, a lithium compound, or a combination thereof;
a lithium metal layer comprising a lithium metal precipitate, wherein the lithium metal precipitate is on the negative electrode active material layer;
a solid electrolyte layer between the positive electrode active material layer and the negative electrode active material layer, and
wherein the sacrificial active material comprises a sulfide solid electrolyte material represented by Formula 1

$$xLiX-(1-x)(yLi_2S-(1-y)P_2S_5) \qquad \text{Formula 1}$$

wherein, in Formula 1,
0≤x≤0.5,
0.6≤y≤0.9, and
X is Cl, Br, I, or a combination thereof.

20. The all-solid-state secondary battery of claim 19, wherein the positive electrode active material layer further comprises a sacrificial positive electrode material having an oxidation-reduction potential which is less than a discharge voltage of the positive electrode active material, and wherein the sacrificial positive electrode material comprises a sacrificial active material and a conductive agent.

21. The all-solid-state secondary battery of claim 19, wherein the negative electrode active material is beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof.

22. The all-solid-state secondary battery of claim 19, wherein the negative electrode active material layer further comprises amorphous carbon.

23. The all-solid-state secondary battery of claim 19, further comprising a negative electrode current collector, wherein the negative electrode active material layer is on the negative electrode current collector.

24. The all-solid-state secondary battery of claim 19, wherein the lithium metal precipitate, the lithium alloy, the lithium compound, or a combination thereof, each independently has a density of about 0.481 to about 0.534 grams per cubic centimeter at 25° C.

25. The all-solid-state secondary battery of claim 23, wherein the lithium metal layer is between the negative electrode current collector and the negative electrode active material layer, the lithium metal layer is between the negative electrode active material layer and the solid electrolyte layer, or a combination thereof.

26. The all-solid-state secondary battery of claim 23, wherein the negative electrode active material layer comprises a combination of amorphous carbon and at least one of beryllium (Be), magnesium (Mg), aluminium (Al), silicon (Si), calcium (Ca), scandium (Sc), chromium (Cr), manganese (Mn), iron (Fe), cobalt (Co), nickel (Ni), copper (Cu), zinc (Zn), gallium (Ga), germanium (Ge), arsenic (As), strontium (Sr), yttrium (Y), zirconium (Zr), niobium (Nb), molybdenum (Mo), technetium (Tc), rhodium (Rh), palladium (Pd), silver (Ag), cadmium (Cd), indium (In), tin (Sn), antimony (Sb), tellurium (Te), barium (Ba), hafnium (Hf), tantalum (Ta), tungsten (W), rhenium (Re), iridium (Ir), platinum (Pt), gold (Au), mercury (Hg), thallium (Tl), lead (Pb), bismuth (Bi), or a combination thereof, and
wherein the lithium metal layer is between the negative electrode active material layer and the negative electrode current collector.

27. A method of manufacturing the all-solid-state secondary battery of claim 1, the method comprising:
providing the positive electrode active material layer;
disposing the solid electrolyte layer on the positive electrode active material layer;
disposing the negative electrode active material layer comprising a negative electrode active material on the solid electrolyte layer; and charging the all-solid-state secondary battery to form a lithium metal layer comprising a lithium metal precipitate to manufacture the all-solid-state secondary battery, wherein the negative electrode active material comprises an element alloyable with lithium or that forms a compound with lithium, and wherein the lithium metal precipitate is on the negative electrode active material layer.

28. The method of claim 27, wherein the charging to form the lithium metal layer is a first charging cycle.

29. The method of claim 27, wherein the lithium metal layer is formed on the negative electrode active material layer.

30. The method of claim 27, wherein the lithium metal layer is formed between a negative electrode current collector and the negative electrode active material layer.

31. The method of claim 27, wherein the lithium metal layer is formed between the negative electrode active material layer and the solid electrolyte layer.

32. The method of claim 27, wherein the disposing of the negative electrode active material layer comprises disposing the negative electrode active material on a negative electrode current collector.

* * * * *